(12) United States Patent
Fujihara et al.

(10) Patent No.: US 9,036,286 B2
(45) Date of Patent: May 19, 2015

(54) READING DATA STORED IN RECORDING MEDIUM

(75) Inventors: Shinobu Fujihara, Yamato (JP);
Takeshi Ishimoto, Kawasaki (JP);
Hiroshi Itagaki, Yokohama (JP);
Kazuhiro Ozeki, Sagamihara (JP)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 996 days.

(21) Appl. No.: 13/141,959

(22) PCT Filed: Aug. 31, 2009

(86) PCT No.: PCT/JP2009/065160
§ 371 (c)(1),
(2), (4) Date: Jun. 23, 2011

(87) PCT Pub. No.: WO2010/073776
PCT Pub. Date: Jul. 1, 2010

(65) Prior Publication Data
US 2011/0261480 A1 Oct. 27, 2011

(30) Foreign Application Priority Data
Dec. 25, 2008 (JP) ................. 2008-329602

(51) Int. Cl.
| | |
|---|---|
| *G11B 20/10* | (2006.01) |
| *G11B 27/30* | (2006.01) |
| *G06F 3/06* | (2006.01) |
| *G11B 27/032* | (2006.01) |
| *G11B 27/10* | (2006.01) |
| *H04N 5/782* | (2006.01) |

(Continued)

(52) U.S. Cl.
CPC ............ *G06F 3/0659* (2013.01); *G06F 3/0613* (2013.01); *G06F 3/0682* (2013.01); *G11B 20/10* (2013.01); *G11B 27/032* (2013.01); *G11B 27/107* (2013.01); *G11B 27/3027* (2013.01); *G11B 2020/1267* (2013.01);
(Continued)

(58) Field of Classification Search
None
See application file for complete search history.

(56) References Cited

U.S. PATENT DOCUMENTS

| | | | |
|---|---|---|---|
| 5,845,316 A | 12/1998 | Hillyer et al. | |
| 6,026,468 A * | 2/2000 | Mase et al. | 711/111 |

(Continued)

FOREIGN PATENT DOCUMENTS

| | | |
|---|---|---|
| JP | 2001118365 A | 4/2001 |
| JP | 2001210014 A | 8/2001 |
| JP | 2006221695 A | 8/2006 |

OTHER PUBLICATIONS

"Serial ATA Native Command Queuing," Jul. 2003, http://www.seagate.com/content/pdf/whitepaper/D2c_tech_paper_intc-stx_sata_ncq.pdf, accessed Jan. 1, 2007, 12 Pages.

(Continued)

*Primary Examiner* — Wayne Young
*Assistant Examiner* — James L Habermehl
(74) *Attorney, Agent, or Firm* — Edward J. Lenart; Katherine S. Brown; Kennedy Lenart Spraggins LLP

(57) ABSTRACT

A device for reading data recorded on a recording medium having multiple tracks, the device including: a receiver that receives designations of a number of data elements to be read; and a determination unit that determines an order of reading the data elements so that, no matter on which track of the tracks each of the data elements is recorded, the data elements are read in an order of recorded locations of the data elements in a direction along the tracks on which the data elements are recorded.

9 Claims, 9 Drawing Sheets

(51) Int. Cl.
  *H04N 9/82* (2006.01)
  *G11B 20/12* (2006.01)

(52) U.S. Cl.
  CPC ...... *G11B 2220/655* (2013.01); *G11B 2220/90* (2013.01); *H04N 5/782* (2013.01); *H04N 9/8205* (2013.01)

(56) References Cited

U.S. PATENT DOCUMENTS

| | | | |
|---|---|---|---|
| 6,349,356 B2 * | 2/2002 | Basham et al. | 711/111 |
| 6,763,427 B1 * | 7/2004 | Doi et al. | 711/111 |
| 8,082,388 B2 * | 12/2011 | Bello et al. | 711/111 |
| 2001/0034811 A1 | 10/2001 | Basham et al. | |
| 2002/0006004 A1 | 1/2002 | Miyamura | |
| 2008/0117752 A1 | 5/2008 | Kishimoto | |

OTHER PUBLICATIONS

Extended PCT Search Report And Written Opinion, PCT/JP2009065160, mail date Feb. 6, 2013, pp. 1-9.

PCT International Preliminary Report on Patentability, PCT/JP2009/065160, mail date Jul. 7, 2011.

* cited by examiner

| dm-a | | |
|---|---|---|
| dm-id entry | m-id entry | d-id entry |
| aaaaaa | mmmm | nnnn |

| dm-l | | | |
|---|---|---|---|
| id | Location-1 | Location-2 | .... |
| mmmm | | | |
| nnnn | | | |

| dm-e | | |
|---|---|---|
| dm-id entry | m-id entry | d-id entry |
| dm03 | m4 | d3 |
| | m6 | |
| | m8 | |

| id entry | Record | Wrap | L-POS(s) | L-POS(e) |
|---|---|---|---|---|
| m4 | 010 | 1 | 810 | 910 |
| m6 | 001 | 1 | 080 | 180 |
| m6 | 030 | 3 | 640 | 740 |
| d3 | 003 | 1 | 210 | 410 |

FIG. 5

READING DATA STORED IN RECORDING MEDIUM

CLAIM OF PRIORITY

This application claims priority under 35 U.S.C §119 to Japanese Patent Application No. 2008-329602, filed Dec. 25, 2008, the entire text of which is specifically incorporated by reference herein, and from which PCT International Application number JP2009/065160, was filed on Aug. 31, 2009.

BACKGROUND OF THE INVENTION

1. Field of the Invention

The field of the invention is data processing, or, more specifically, methods, apparatus, and products for reading data recorded on a recording medium having multiple tracks.

2. Description of Related Art

In recent years, tape media have more frequently been used as archives of photo data, video data, and the like. In this case, not only data (main data) itself but also metadata which is additional information of the data is important as data required to be stored for a long time. Here, conceivable metadata of photo data, for example, includes a place of shooting the photo, a date and time, an object of shooting, a person shooting the photo, equipment used for shooting, a recording format, a file name, a file size, and the like.

Since data and metadata are associated with each other as described above, it is preferable to process data and metadata together in execution of such processing as backup, archiving, or migration. This will be described by taking archiving in a tape medium as an example. Suppose a case where data and metadata are separately processed and archived in separate tape cartridges. In this case, in order to acquire information of data recorded on a certain tape cartridge, it is necessary to find the metadata of the data from a different tape cartridge. This increases costs to acquire the information. Thus, it is preferable to archive the data and the metadata together in the same tape cartridge.

Nevertheless, even if the data and the metadata are archived in the same cartridge, it is difficult to ensure that the data and the metadata are recorded in locations adjacent to each other in the tape cartridge. A tape medium is a sequential device and the metadata is added or deleted later. In consideration of these, apparently data cannot be recorded in a desired location on the tape medium. Accordingly, even if a pair or a combination of data and metadata is recorded on the same cartridge, the data and the metadata might be recorded in dispersed locations on the tape medium.

Meanwhile prior art techniques include replaying contents from a large-volume tape medium on which multiple contents are recorded. A title list of a tape medium is provided with a field for the number of contents, a field for a total time period, a genre field, and a content field. When a desired content is selected with a cursor from contents displayed in the content field, a start address of the selected content is read, so that video data of the content is reproduced.

In a case where data and metadata associated with each other are recorded in dispersed locations on the tape cartridge as described above, reading of a combination of all the data and metadata associated with each other from the tape cartridge requires repeated operations of reading necessary data after moving to a location where the data is recorded. That is, there has been a problem that multiple data elements cannot be read efficiently when these data elements to be read are recorded on the tape medium in a dispersed manner. Incidentally, the same problem can also be pointed out in a recording medium other than a tape medium, such as a magnetic disk.

SUMMARY OF THE INVENTION

Devices and methods for reading data recorded on a recording medium having a number of tracks are disclosed in this specification. Such devices include a receiver that receives designations of a number of data elements to be read; and a determination unit that determines an order of reading the number of data elements so that, no matter on which track of the number of tracks each of the number of data elements is recorded, the number of data elements are read in an order of recorded locations of the data elements in a direction along the tracks on which the data elements are recorded.

Also disclosed are devices and methods for reading data recorded on a tape medium that includes a first track group from which data is read in a first direction from a leading end to a trailing end of the tape medium, and a second track group from which data is read in a second direction from the trailing end to the leading end. Such devices include a receiver that receives designations of a number of data elements to be read; an acquisition unit that acquires an identification information piece for identifying a track on which each of the number of data elements is recorded and a location information piece indicating a recorded location of the each data element in a direction along the track; a divider that divides the number of data elements into a first data element group recorded in the first track group and a second data element group recorded in the second track group based on the identification information pieces acquired by the acquisition unit; and a determination unit that determines the order of reading the number of data elements based on the location information pieces acquired by the acquisition unit so that, no matter on which track of the first track group each data element of the first data element group is recorded, the first data element group is read in the order of the recorded locations of the data elements in the direction along the tracks on which the data elements are recorded, and no matter on which track of the second track group each data element of the second data element group is recorded, the second data element group is read in the order of the recorded locations of the data elements in the direction along the tracks on which the data elements are recorded.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 5 is a chart showing an example of a location table used in the embodiment of the present invention.

DETAILED DESCRIPTION OF EXEMPLARY EMBODIMENTS

Below, a description is given in detail of a mode for carrying out the present invention (hereinafter, referred to as an "embodiment") with reference to the attached drawings. Note that the present invention is applicable to any storage medium, but the description is given by taking a tape medium (hereinafter, simply referred to as a "tape") as an example. In the first place, a digital data archive device to which this embodiment is applied (hereinafter, simply referred to as an "archive device") will be described.

Figure 1:
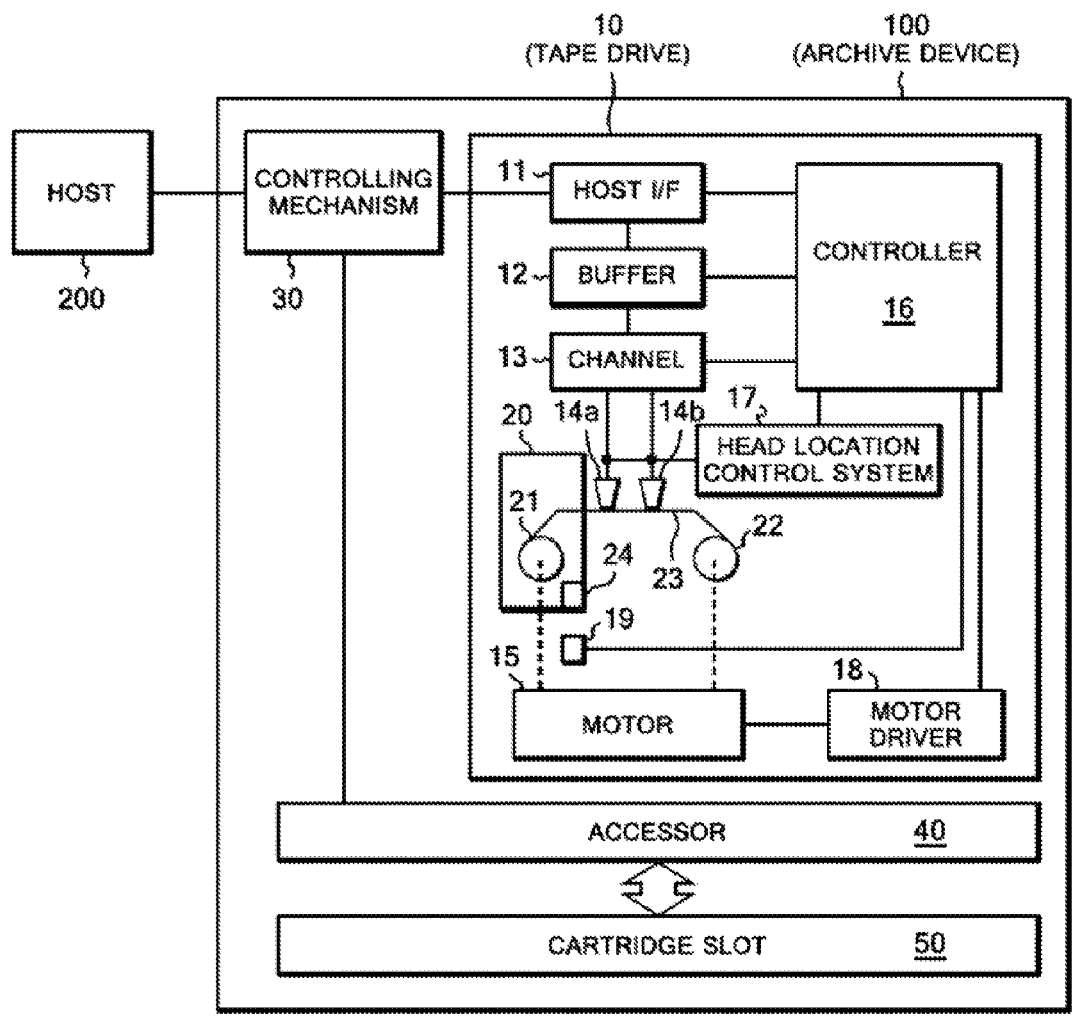
FIG. 1 is a block diagram showing a configuration of an archive device to which an embodiment of the present invention is applied.

FIG. 1 is a diagram showing a configuration example of an archive device 100 to which this embodiment is applied. As shown in FIG. 1, the archive device 100 includes a tape drive 10, a controlling mechanism 30, an accessor 40, and a cartridge slot 50.

Among these, the tape drive 10 includes a host interface (hereinafter, referred to as a "host I/F") 11, a buffer 12, a channel 13, a writing head 14a, a reading head 14b, and a motor 15. The tape drive 10 also includes a controller 16, a head location control system 17, and a motor driver 18. Furthermore, a tape cartridge 20 (hereinafter, simply referred to as a "cartridge") is also illustrated, since the cartridge 20 is loadable on the tape drive 10 by being inserted into the tape drive 10. The cartridge 20 includes a tape 23 wound around reels 21, 22. With the rotation of the reels 21, 22, the tape 23 is moved in a longitudinal direction thereof, from the reel 21 to the reel 22, or from the reel 22 to the reel 21. A magnetic tape is exemplified here as the tape 23, but a tape medium other than the magnetic tape may be used.

The cartridge 20 also includes a cartridge memory 24. The cartridge memory 24 records information on, for example, how data is written to the tape 23. Data can be accessed at a high speed by checking indexes of the data written to the tape 23, a use status of the tape 23, and the like in a non-contact manner by using an RF interface, for example. Note that an interface, like this RF interface, for accessing the cartridge memory 24 is shown as a cartridge memory interface (hereinafter, referred to as a "CM I/F") 19 in the drawing.

Meanwhile, the host I/F 11 communicates with a host 200 through the controlling mechanism 30. For example, from the host 200, the host I/F 11 receives a command giving an instruction to write data to the tape 23, a command giving an instruction to move the tape 23 to a target location, and a command giving an instruction to read data from the tape 23. Incidentally, SCSI is exemplified as a communication standard used for the host I/F 11. In SCSI, a first command corresponds to a Write command; a second command, a Locate command or a Space command; and a third command, a Read command. The host I/F 11 responds to the host 200, whether processing in response to a corresponding one of the commands succeeds or fails.

The buffer 12 is a memory in which data to be written to the tape 23 and data read from the tape 23 is accumulated. For example, the buffer 12 is configured of a DRAM (dynamic random access memory). In addition, the buffer 12 is formed of multiple buffer segments, and each buffer segment stores therein a dataset which is a unit of reading from and writing to the tape 23. The channel 13 is a communication channel used for transmitting to the writing head 14a data to be written to the tape 23, and for receiving from the reading head 14b data read from the tape 23.

When the tape 23 moves in a longitudinal direction thereof, the writing head 14a writes information to the tape 23. When the tape 23 moves in the longitudinal direction, the reading head 14b reads information from the tape 23.

The motor 15 rotates the reels 21, 22. Although the motor 15 is shown by a single rectangle in the drawing, it is preferable to provide a total of two motors 15, one for each of the reels 21, 22.

The controller 16 controls the tape drive 10 on the whole. For example, the controller 16 controls reading data from or writing data to the tape 23 in accordance with a command received by the host I/F 11. The controller 16 also controls the head location control system 17 and the motor driver 18.

The head location control system 17 is a system which performs control so that the writing head 14a and the reading head 14b search for one or multiple desired wraps. Note that the wrap is a group of multiple tracks of the tape 23. When there arises a need for switching to a different wrap, electrical switching of the writing head 14a and the reading head 14b is also required. The head location control system 17 controls such switching.

The motor driver 18 drives the motor 15. When the two motors 15 are provided as described above, two motor drivers 18 should be provided, accordingly.

Meanwhile, the controlling mechanism 30 is a mechanism which controls the accessor 40 and the tape drive 10 in response to an instruction from the host 200. In other words, the controlling mechanism 30 instructs the accessor 40 to load the cartridge 20 onto the tape drive 10 so that data designated by the host 200 can be read and written, while the controlling mechanism 30 instructs the tape drive 10 to read or write the data designated by the host 200 from or to the cartridge 20 loaded by the accessor 40.

The accessor 40 takes the cartridge 20 out of the cartridge slot 50 and then loads the cartridge 20 onto the tape drive 10 under the control of the controlling mechanism 30. The cartridge slot 50 is a place for storing a cartridge 20 on which reading or writing is not performed. Here, the cartridge slot 50 is shown by a single rectangle, but actually, is multiple slots for respectively storing multiple cartridges.

Note that the drawing shows a single tape drive 10, but multiple tape drives 10 may be provided. In this case, the controlling mechanism 30 instructs the accessor 40 to load the cartridge 20 onto a tape drive 10 which is a transmission destination of a read command or a write command, by notifying the accessor 40 of identification information on the tape drive 10.

Meanwhile, suppose a case where data and metadata which are related to each other are recorded in dispersed locations on the tape 23 used for the archive device 100 as described above. In such a case, in order to read a combination of all the data and metadata related to each other from the tape 23, it is necessary to repeat an operation of reading necessary data after moving to a location where the data is recorded.

This will be described concretely.

Generally, when information is recorded as a data piece or a metadata piece on the tape 23, the information is recorded thereon by being divided into units called records. Then, desired information is acquired from the tape 23 by reading multiple consecutive records from information obtained as a result of a designation in a format that "the N-th record from the beginning"

Here, for example, suppose a case where a photo data piece is recorded as 0th to 100th records, and metadata pieces thereof are recorded in two locations as 300th to 308th records and as 428th and 436th records. In this case, reading all the photo data piece and the metadata pieces thereof requires execution of a sequence as below.

(1) The tape 23 is moved to a position just in front of the 0th record.

(2) One hundred and one records forming the photo data piece are read.

(3) The tape 23 is moved to a position just in front of the 300th record.

(4) Nine records forming the first metadata piece are read.

(5) The tape 23 is moved to a position just in front of the 428th record.

(6) Nine records forming the second metadata piece are read.

Note that the logical location information "N-th record from the beginning" does not indicate a physical location on the tape 23. For example, in a linear tape method such as LTO (Linear Tape-Open), data pieces are recorded on the tape 23 while reciprocal movements are performed. Thus, it cannot be said that a larger record number shows a location farther from the beginning of the tape 23. Accordingly, in order to efficiently read all of the data and metadata pieces related to each other, a special contrivance is needed.

In addition, when receiving a command "Move to a position just in front of the N-th record" from the host 200, the tape drive 10 might access the record at a high speed in some cases by finding a physical location of the target record on the tape 23 based on information as a tape directory in the tape drive 10. However, this is speeding up of accessing individual records, but does not enhance the total rate of accessing a data piece recorded at multiple locations in the dispersed manner.

Hence, this embodiment employs a recording method in which a data piece identified by an identifier d-id and a metadata piece identified by an identifier m-id are recorded on the tape 23 so that association between the data piece and the metadata piece is identified by an identifier dm-id. In the method, recorded locations of the data and metadata pieces on the tape 23 are also managed. Thereby, a rate of reading the data and metadata pieces from the tape 23 is enhanced.

At this time, the recorded locations of the data and metadata pieces on the tape 23 are recorded in a semiconductor memory provided to the cartridge 20, and thereby the rate of reading the data and metadata pieces from the tape 23 is enhanced.

In addition, in reading data and metadata pieces which are associated with each other by a dm-id, the order of reading the data and metadata pieces is optimized based on the current access location on the tape 23 and the recorded locations thereon of the respective data and metadata pieces.

Below, a description is given in detail of a configuration implementing such an operation.

As a premise of the description, associating data and metadata pieces with each other is firstly described.

Figures 2A, 2B, 2C:
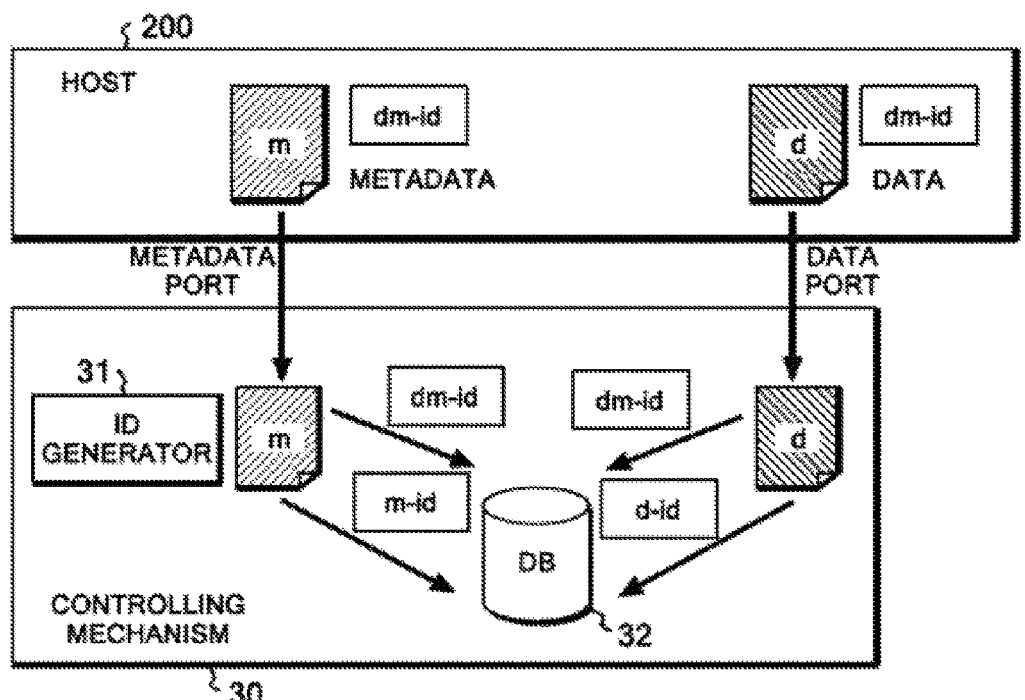
FIG. 2 is a diagram for explaining associating a dm-id, a d-id, and an m-id with one another in the embodiment of the present invention.

FIG. 2 is a diagram schematically showing how data and metadata pieces are associated with each other.

As shown in Part (a) of FIG. 2, the host 200 creates an association between a data piece and a metadata piece by assigning any identification number dm-id to each of the data and the metadata pieces. Then, the data piece is passed on to the controlling mechanism 30 through a data port, while the metadata piece is passed on to the controlling mechanism 30 through a metadata port.

Next, the controlling mechanism 30 handles information passed on through the data port, as a data piece, and an ID generator 31 generates a d-id and assigns the d-id to the data piece. In this respect, the d-id is an identification number of a data piece, and is a unique value at least in an environment in which the archive device 100 operates. In addition, information passed on through the metadata port is handled as a metadata piece, and the ID generator 31 generates an m-id and assigns the m-id to the metadata piece. In this respect, the m-id is an identification number of a metadata piece, and is a unique value at least in an environment in which the archive device 100 operates. Note that even if the data and metadata pieces are passed on separately in time, a correspondence between can be built up in the archive device 100 by use of the dm-id.

Thereby, the controlling mechanism 30 records the dm-id-based correspondence between the data piece and the metadata piece in a dm-a table (hereinafter, simply referred to as a "dm-a") in a database (DB) 32. Part (b) of FIG. 2 shows format of a dm-a. Here, one data piece is associated with one metadata piece, but a correspondence between M data piece or pieces and N metadata piece or pieces (M and N are natural numbers) can be built up.

In addition, the controlling mechanism 30 records recording places of the data and metadata pieces in the archive device 100 for each of the data piece and the metadata piece in a dm-1 table (hereinafter, simply referred to as a "dm-1") in the DB 32. Part (c) of FIG. 2 shows a format of the dm-1. Note that when multiple storage spaces are implemented in the archive device 100 and when multiple copies of the data and metadata pieces exist in the spaces, as many entries as the copies are registered in the dm-1. Such entries are shown in the drawing as Location-1, Location-2, and . . . .

Here, associating a data piece and a metadata piece with each other is described by using a concrete example.

Figures 3A, 3B:
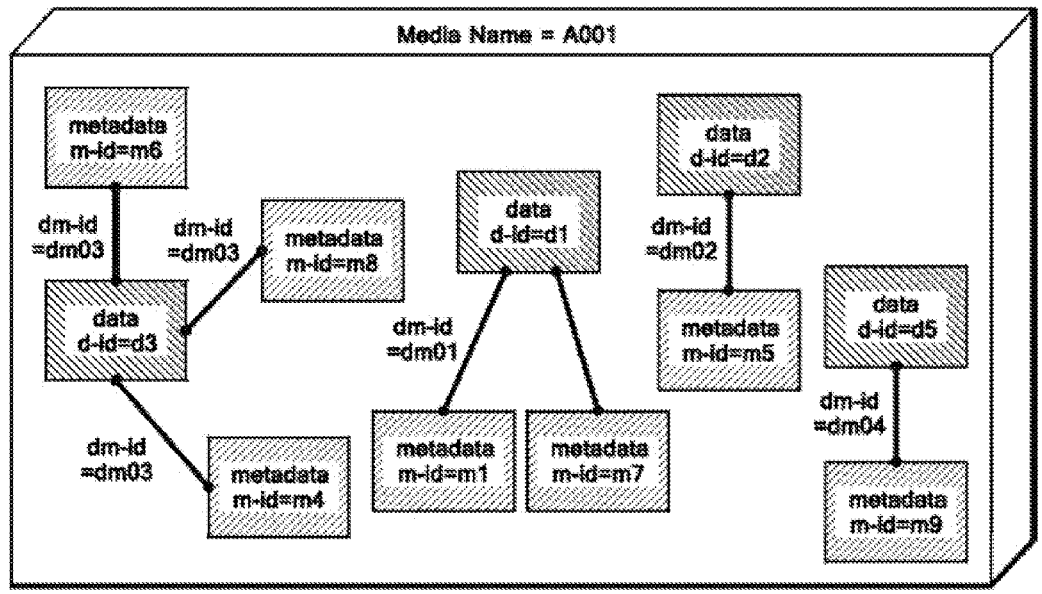
FIG. 3 is a diagram showing a concrete example of associating a dm-id, a d-id, and an m-id with one another in the embodiment of the present invention.

FIG. 3 is a diagram showing the concrete example of associating a data piece and a metadata piece with each other.

Part (a) of FIG. 3 shows a state in which a data piece identified by a d-id and a metadata piece identified by an m-id are recorded on a recording medium whose medium name is "A001" while an association identified by a dm-id is made. Concretely, a data piece whose d-id is d3 and metadata pieces whose m-ids are m4, m6, and m8, respectively, are recorded while an association whose dm-id is dm03 is made. A data piece whose d-id is d1 and metadata pieces whose m-ids are m1 and m7, respectively, are recorded while an association whose dm-id is dm01 is made. A data piece whose d-id is d2 and a metadata piece whose m-id is m5 are recorded while an association whose dm-id is dm02 is made. A data piece whose d-id is d5 and a metadata piece whose m-id is m9 are recorded while an association whose dm-id is dm04 is made.

In addition, Part (b) of FIG. 3 shows how identifiers (a d-id and an m-id) of the data and metadata pieces associated with each other by the dm-id of dm03 are listed in the dm-a.

Meanwhile, the data and metadata pieces are written to the tape 23 when preparation is completed, and thus the order of recording the data and metadata pieces on the tape 23 is not uniquely determined. Accordingly, even if a correspondence between the data and metadata pieces is logically built up by the dm-id, physical recorded locations on the tape 23 might be dispersed in recording these on the tape 23.

Figure 4:
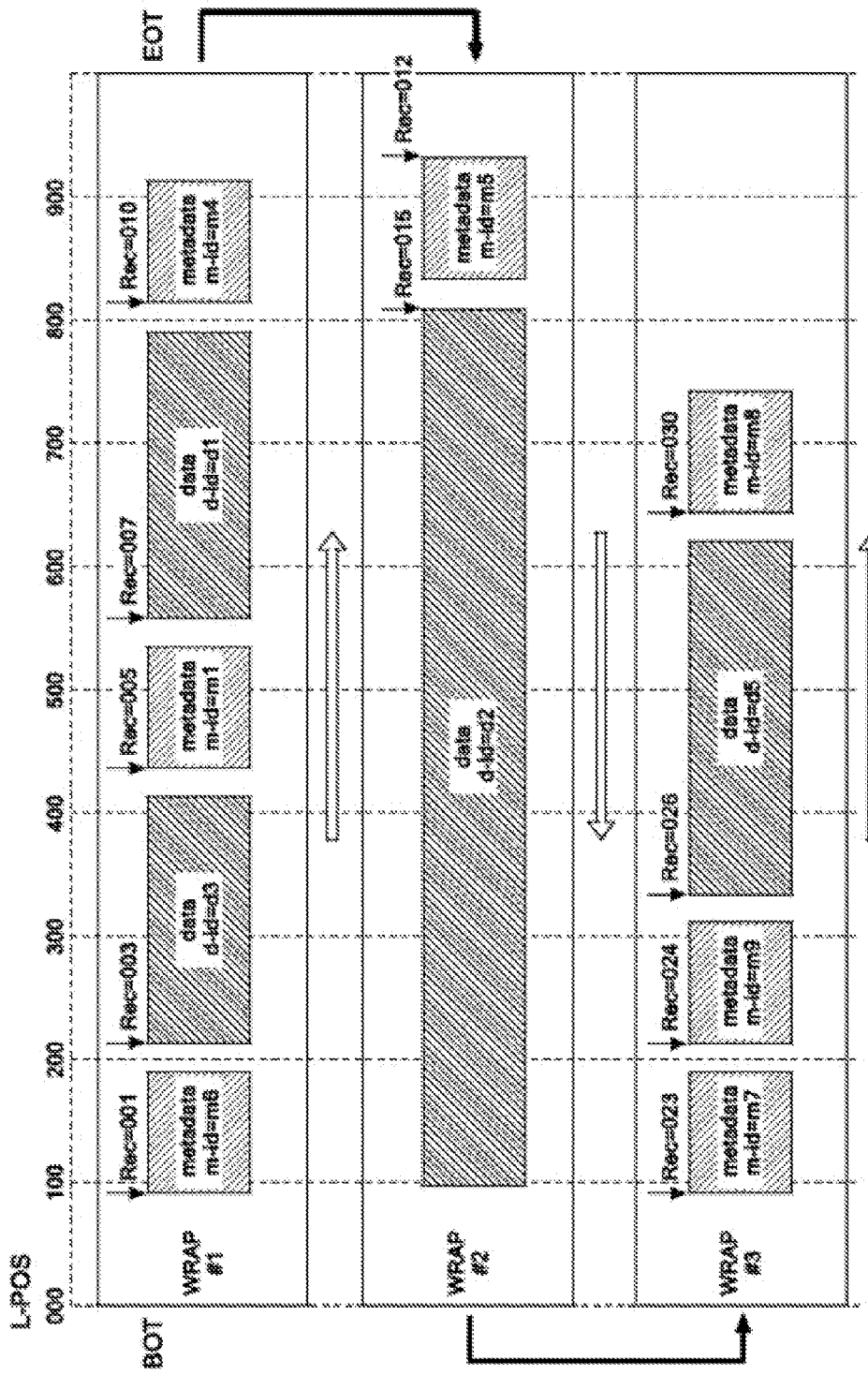
FIG. 4 is a diagram showing a state in which data pieces and metadata pieces are arranged in the dispersed manner on a tape in the embodiment of the present invention.

FIG. 4 is a diagram showing an example of data and metadata pieces recorded in such a dispersed manner on the tape 23. As shown in the drawing, multiple wraps exist on the tape 23. Note that outlined arrows the drawing each indicate a direction of writing a data piece, and solid arrows each indicate that a travelling direction of the tape 23 is reversed.

Here, firstly, the metadata piece whose m-id is m6, the data piece whose d-id is d3, the metadata piece whose m-id is m1, the data piece whose d-id is d1, and the metadata piece whose m-id is m4 are written in a forward direction with respect to a wrap #1. Next, the metadata piece whose m-id is m5 and the data piece whose d-id is d2 are written to the wrap #2 in a backward direction. Then, the metadata piece whose m-id is m7, the metadata piece whose m-id is m9, the data piece whose d-id is d5, and the metadata piece whose m-id is m8 are written to a wrap #3 again in the forward direction.

In sum, even though the data and metadata pieces as shown in Part (a) of FIG. 3 are stored in a certain recording medium, the data and metadata pieces might be arranged on the tape 23 regardless of the association between when being transferred to the tape 23. In this case, it is not possible to read data and metadata pieces corresponding to a certain dm-id unless positioning on the tape 23 is performed multiple times. Thus, the accessing performance is deteriorated in accordance with the times of positioning on the tape 23.

Hence, in this embodiment, information on physical locations of data and metadata pieces on the tape 23 is recorded on the cartridge memory 24, for example. Note that the physical location information is indicated by: a value indicating in which number of wrap (in which round of one-way travelling) a data piece or a metadata piece is recorded; or an L-POS indicating a location in a direction from the leading end to the trailing end of the tape 23.

FIG. 5 is an example of a location table for dm03. A list of the metadata pieces m4, m6, and m8 and the data piece d3 associated with each other based on the dm-id of dm03, the record numbers thereof, and information (wrap number and L-POSs) on physical locations thereof are recorded in this location table. Here, as the L-POS, an L-POS (start LPOS) denoting a start point of a record and an L-POS (end LPOS) denoting an end point of the record are recorded. The drawing shows the former by L-POS(s) and the latter by L-POS(e). Note that the wrap number is an example of identification information for identifying a track on which each data element of multiple data elements is recorded, and the L-POS is an example of location information indicating a recorded location of each data element of the multiple data elements in a direction along tracks on which the data elements are recorded.

Thereafter, in this embodiment, an optimum reading order is determined based on the information recorded in this location table.

Figure 6:
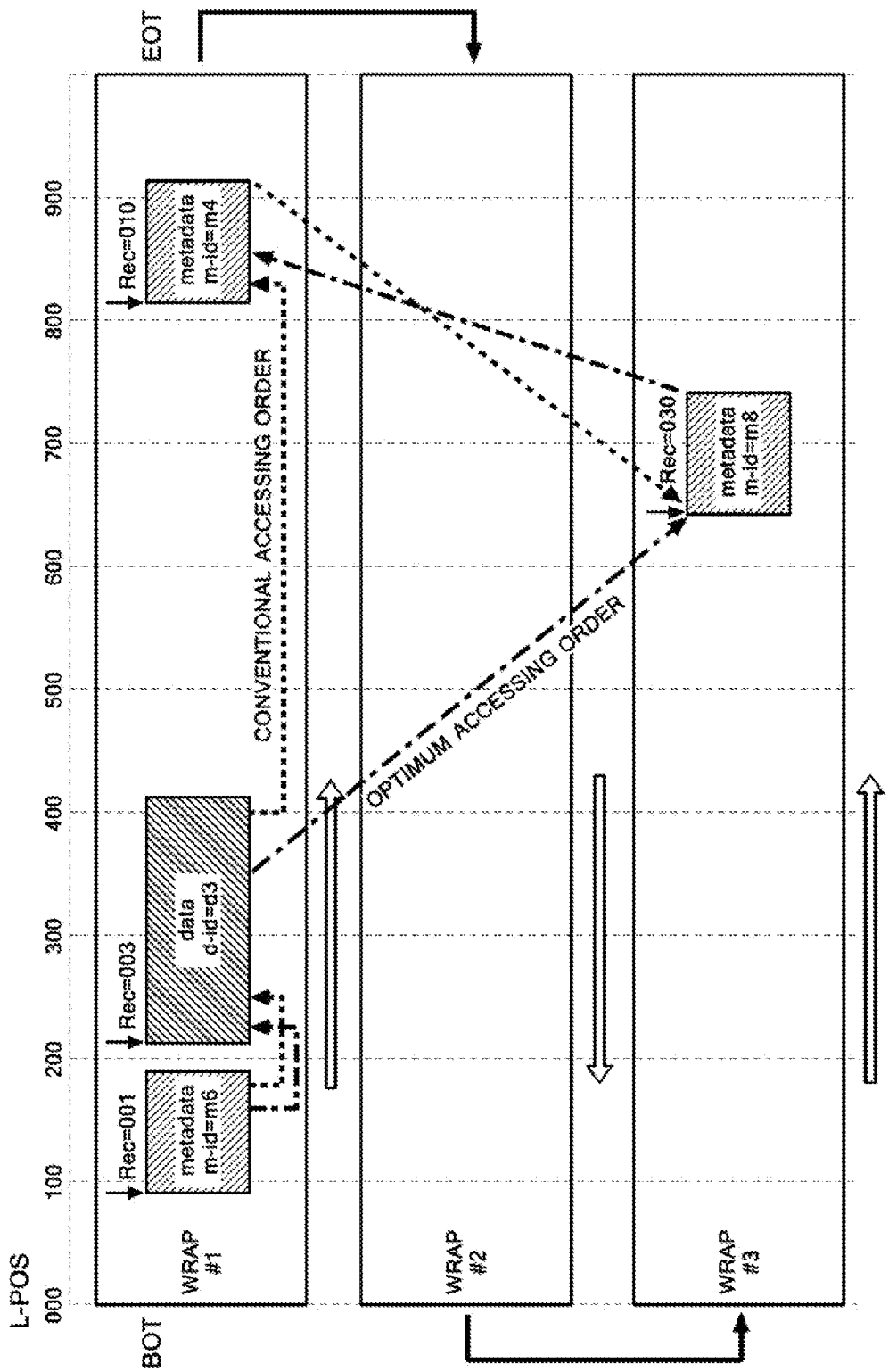
FIG. 6 is a diagram showing procedures to efficiently read data and metadata pieces in the state where the data and metadata pieces are arranged in the dispersed manner on the tape in the embodiment of the present invention.

FIG. 6 shows an example of an optimum accessing order in reading data and metadata pieces corresponding to the dm03. The tape drive 10 acquires information on physical locations of the data and metadata pieces corresponding to the dm03 from the cartridge memory 24 and determines the reading order so as to minimize a distance of moving involving no data reading.

In this example, the location table in FIG. 5 shows that the metadata piece m8 is recorded between the data piece d3 and the metadata piece m4 in the same travelling direction as the data piece d3 and the metadata piece m4. Accordingly, a travelling distance is made shorter by reading the metadata piece m8 before the metadata piece m4, so that the accessing performance is enhanced.

Next, a description is given in detail of the tape drive 10 which performs such an operation.

Figure 7:
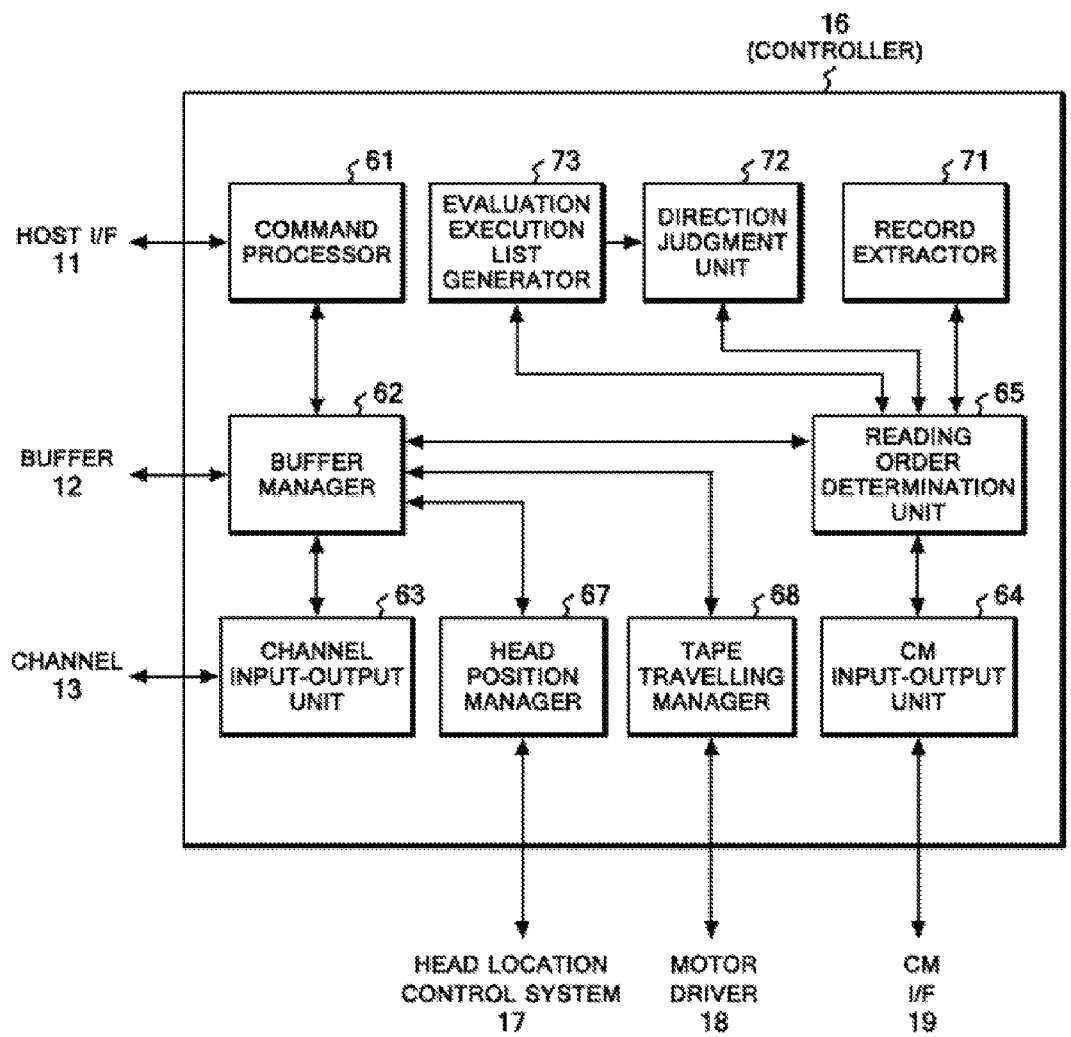
FIG. 7 is a block diagram showing a functional configuration of a controller in the embodiment of the present invention.

FIG. 7 is a block diagram showing a functional configuration example of the controller 16 of the tape drive 10.

As shown in the drawing, the controller 16 includes a command processor 61, a buffer manager 62, a channel input-output unit 63, a cartridge memory input-output unit (hereinafter, referred to as a CM input-output unit") 64, a reading order determination unit 65, a record extractor 71, a direction judgment unit 72, an evaluation execution list generator 73, a head position manager 67, and a tape travelling manager 68.

Among these, the command processor 61 receives a command from the host I/F 11. Note that commands include a Write command giving an instruction to store a data piece in the buffer 12, a synchronization command giving an instruction to write a data piece stored in the buffer 12 to the tape 23, a Read command giving an instruction to read a data piece from the tape 23, and the like. This embodiment provides the command processor 61 as an example of a receiver that receives designations of multiple data elements to be read.

Upon receipt of a Write command by the command processor 61, the buffer manager 62 prepares a corresponding data piece in the buffer 12. In addition, upon receipt of a synchronization command by the command processor 61, the buffer manager 62 reads a corresponding data piece from the buffer 12 and then outputs the data piece to the channel input-output unit 63. Further, upon receipt of a Read command by the command processor 61, the buffer manager 62 performs following processing. Specifically, the buffer manager 62 instructs the channel input-output unit 63 to read a target data piece if the data piece does not exist in the buffer 12, while the buffer manager 62 transmits a target data piece back to the host 200 through the command processor 61 if the data piece exists in the buffer 12.

The channel input-output unit 63 outputs, to the channel 13, a data piece read by the buffer manager 62 from the buffer 12 and outputs, to the buffer manager 62, a data piece received from the channel 13.

The CM input-output unit 64 reads a location table stored in the cartridge memory 24, through the CM I/F 19. This embodiment provides the CM input-output unit 64 as an example of an acquisition unit for acquiring location information and an example of an acquisition unit for further acquiring identification information.

The reading order determination unit 65 receives the location table read by the CM input-output unit 64 and determines the order of reading data and metadata pieces by controlling the record extractor 71, the direction judgment unit 72, and the evaluation execution list generator 73 which will be described later. This embodiment provides the reading order determination unit 65 as an example of a determination unit for determining the order of reading multiple data elements.

The record extractor 71 receives the location table from the reading order determination unit 65 and extracts a record group related to the specified d-id and m-id.

The direction judgment unit 72 judges whether the data piece or the metadata piece in each record included in the specified record group is recorded in forward-direction travelling or recorded in backward-direction travelling. Then, the direction judgment unit 72 divides the specified record group into the former record group and the latter record group. Here, the data piece or the metadata piece in the former record group is an example of that in a first data element group recorded in a first track group from which a data piece is read in a first direction. The data piece or the metadata piece in the latter record group is an example of that in a second data element group recorded in a second track group from which a data piece is read in a second direction reverse to the first direction.

The evaluation execution list generator 73 generates a list of records which are targets of execution of an evaluation for determining the order of reading the data and metadata pieces.

The head position manager 67 outputs, to the head location control system 17, a signal for offsetting the locations of the writing head 14a and the reading head 14b with respect to the tape 23 in a width direction of the tape 23. The head position manager 67 also acquires information on current locations, of the writing head 14a and the reading head 14b, on the tape 23 in the width direction thereof.

The tape travelling manager 68 outputs, to the motor driver 18, a signal for travelling the tape 23 in the forward direction and a signal for travelling the tape 23 in the backward direction.

Next, a description is given in detail of an operation of the tape drive 10 according to the embodiment.

Firstly, the host 200 transmits a Read command including a dm-id to the archive device 100. Then, based on a corresponding dm-a, the controlling mechanism 30 in the archive device 100 identifies a d-id and m-ids associated with the dm-id. The controlling mechanism 30 also identifies a cartridge 20 associated with the d-id and the m-ids based on the dm-1 and instructs the accessor 40 to load a corresponding cartridge 20 on the tape drive 10. Subsequently, the controlling mechanism 30 transmits the d-id and the m-ids to the tape drive 10. In response to this, an operation of the tape drive 10 is started.

Figure 8:
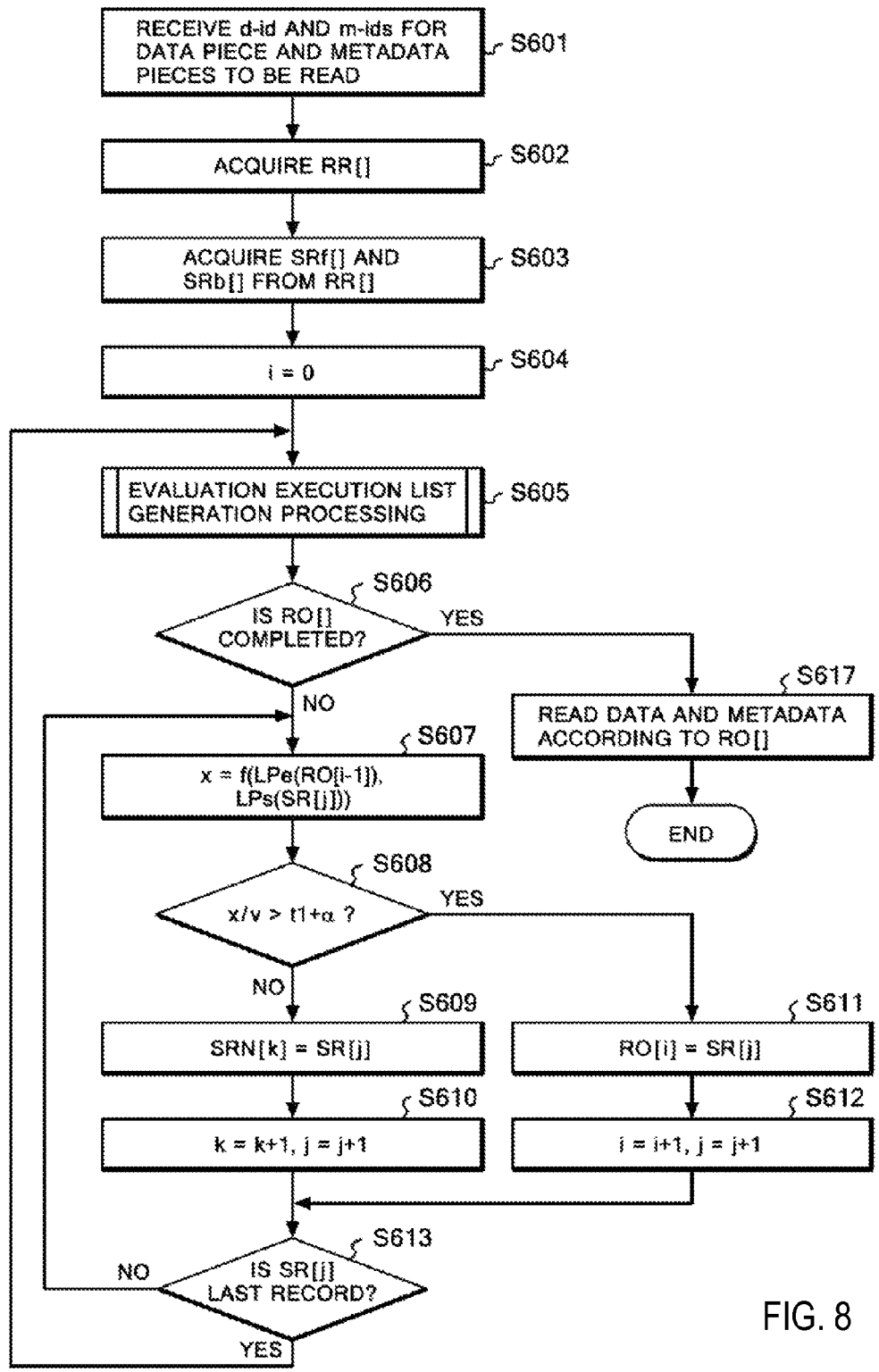
FIG. 8 is a flowchart showing an example of an operation of the controller in the embodiment of the present invention.

FIG. 8 is a flowchart showing an example of an operation of the controller 16 in the tape drive 10 in this event.

Firstly, through the host I/F 11, the command processor 61 in the controller 16 receives a d-id and m-ids for identifying a data piece and metadata pieces to be read (Step 601). Then, the d-id and the m-ids are passed on to the reading order determination unit 65 through the buffer manager 62 and further passed on to the record extractor 71.

Next, under the control of the reading order determination unit 65, the record extractor 71 acquires a required record list RR[ ] which is a list of records required to determine a reading order (Step 602). Concretely, the reading order determination unit 65 firstly instructs the CM input-output unit 64 to read, through the CM I/F 19, a location table stored in the cartridge memory 24. Then, the reading order determination unit 65 receives the location table read by the CM input-output unit 64 and passes on the location table to the record extractor 71. Thereby, the record extractor 71 extracts records including the d-id or the m-ids thus passed on in Step 601 from multiple records included in the location table. Then, this required record list RR[ ] is transmitted back to the reading order determination unit 65.

Next, under the control of the reading order determination unit 65, the direction judgment unit 72 acquires a forward-direction evaluation target list SRf[ ] and a backward-direction evaluation target list SRb[ ] from the required record list RR[ ] (Step 603). Concretely, the reading order determination unit 65 firstly passes on the required record list RR[ ] to the direction judgment unit 72, and the direction judgment unit 72 divides the required record list RR[ ] into the forward-direction evaluation target list SRf[ ] and the backward-direction evaluation target list SRb[ ] based on the wrap numbers included in the required record list RR[ ]. For example, a record related to the data piece or each metadata piece recorded in an odd-numbered wrap is assigned to the SRf[ ], while a record related to the data piece or each metadata piece recorded in an even-numbered wrap is assigned to the SRb[ ]. Then, these evaluation target lists SRf[ ] and SRb[ ] are transmitted back to the reading order determination unit 65.

Thereafter, the reading order determination unit 65 substitutes 0 for a variable i indicating an order of reading the data and metadata pieces (Step 604).

Then, under the control of the reading order determination unit 65, the evaluation execution list generator 73 performs evaluation execution list generation processing in which an evaluation execution list SR[ ] is generated (Step 605). Note that the evaluation execution list SR[ ] represents records each related to the data piece or the metadata piece which is a target of execution of evaluation of whether reading thereof can be performed within a single travelling involving no inversion of the reading head 14b. This evaluation execution list SR[ ] is transmitted back to the reading order determination unit 65. In addition, if a reading order list RO[ ] is completed in the evaluation execution list generation processing, information indicating the completion is transmitted back to the reading order determination unit 65. Incidentally, the details of the evaluation execution list generation processing will be described later.

Meanwhile, after this evaluation execution list generation processing is terminated, the reading order determination unit 65 judges whether or not the reading order list RO[ ] in which records each related to the data piece or the metadata piece are stored in the reading order is completed (Step 606).

Here, if the reading order list RO[ ] is not completed yet, the reading order determination unit 65 sets in the reading order list RO[ ] a record related to the data piece or the metadata piece readable in a single travelling involving no inversion of the reading head 14b among the records included in the evaluation execution list SR[ ], while the reading order determination unit 65 sets a record related to a data piece or metadata pieces other than the readable data piece or the metadata piece, in a reevaluation target list SRN[ ].

In other words, the reading order determination unit 65 firstly calculates a distance from an end LPOS of an already determined RO[i−1] to a start LPOS of a current evaluation target SR[j], the RO[i−1] being the most recent element of the reading order list (Step 607). Note that in the drawing, x denotes a distance; LPs(n), a start LPOS of a record n; LPe(n), an end LPOS of the record n; and f(y, z), a distance between y and z.

Next, the reading order determination unit 65 judges whether or not x/v is larger than t1+α (Step 608). Here, v denotes a speed of the tape 23. In addition, t1 denotes a time period required for moving from a wrap to a wrap and is determined based on the wrap number included in the RO[i−1] and the wrap number included in the SR[j]. Note that a case of the same wrap number therein results in t1=0. Furthermore, α is a margin value for guaranteeing a time fluctuation due to a physical difference or the like, and needs to be set at an appropriate value depending on a system applied thereto.

As a result, a case where x/v is not larger than t1+α means that when the reading head 14b located at the end LPOS of the RO[i−1] is moved to the wrap in which the SR[j] is recorded, the reading head 14b has passed the start LPOS of the SR[j]. Thus, the reading order determination unit 65 adds the SR[j] as an SRN[k] to the reevaluation target list (Step 609). Then, k is incremented by one and j is incremented by one (Step 610). Thereafter, the reading order determination unit 65 judges whether the SR[j] is the last record (Step 613). If the SR[j] is not the last record, the processing returns to Step 607. In sum in this case, no new element is added to the RO[ ], but the evaluation target element in the SR[ ] is changed to a next element, so that the similar evaluation is performed.

On the other hand, a case where x/v is determined larger than t1+α as a result of the judgment means that the reading head 14b passes the start LPOS of the SR[j] after the reading head 14*b* located at the end LPOS of the RO[i−1] is moved to the wrap in which the SR[j] is recorded. Thus, the reading order determination unit 65 adds the SR[j] as an RO[i] to the reading order list (Step 611). Then, i is incremented by one and j is incremented by one (Step 612). Thereafter, the reading order determination unit 65 judges whether the SR[j] is the last record (Step 613). If the SR[j] is not the last record, the processing returns to Step 607. In sum in this case, a new element related to the data piece or any of the metadata pieces determined as a target to be read here is added to the RO[ ], and the evaluation target element in the SR[ ] is changed to a next element, so that the similar evaluation is performed.

Meanwhile, if the SR[j] is determined as the last record in Step 613, the reading order determination unit 65 returns to Step 605 to perform processing of reading order list settings for a different direction, or to perform processing of reading order list settings for the record set in Step 609 in the reevaluation target list.

On the other hand, if the reading order list RO[ ] is completed in Step 606, the reading order determination unit 65 passes on the reading order list RO[ ] to the buffer manager 62, and the buffer manager 62 reads the data and metadata pieces according to the reading order list RO[ ] (Step 617).

Concretely, the head position manager 67 having received an instruction from the buffer manager 62 controls the head location control system 17 so that the reading head 14*b* is positioned in the width direction of the tape 23. In addition, the tape travelling manager 68 having received an instruction from the buffer manager 62 controls the motor driver 18 so that the tape 23 travels. Meanwhile, the channel input-output unit 63 acquires through the channel 13 the data and metadata pieces read by the reading head 14*b* and passes on the data and metadata pieces to the buffer manager 62. The buffer manager 62 accumulates the data and metadata pieces in the buffer 12. Then, the data and metadata pieces accumulated in the buffer 12 are transmitted to the controlling mechanism 30.

Next, a description is given in detail of the evaluation execution list generation processing.

Figure 9:
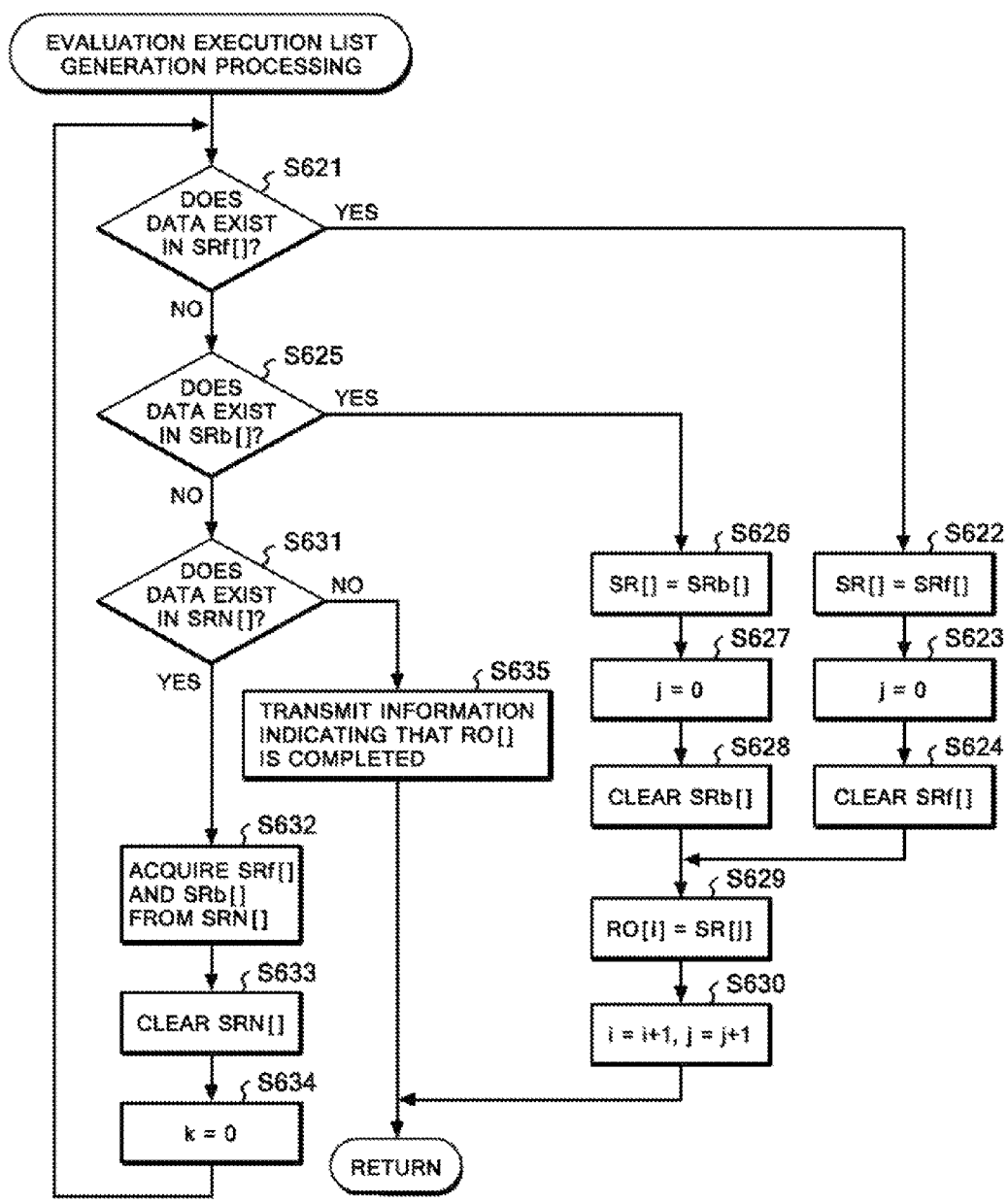
FIG. 9 is a flowchart showing an example of an operation of an evaluation execution list generator in the controller in the embodiment of the present invention.

FIG. 9 is a flowchart showing an example of an operation of the evaluation execution list generation processing by the evaluation execution list generator 73.

Firstly, the evaluation execution list generator 73 judges whether or not a data piece exists in the forward-direction evaluation target list SRf[ ] (Step 621). As a result of the judgment, if a data piece is determined to exist in the SRf[ ], the evaluation execution list generator 73 copies the SRf[ ] to the SR[ ] (Step 622), substitutes 0 for j (Step 623), and clears the SRf[ ] (Step 624). Thereafter, the evaluation execution list generator 73 sets the SR[j] to the RO[i] (Step 629). In this case, for example, if the evaluation execution list generation processing is called for the first time, 0 has been substituted for i in Step 604 immediately before the evaluation execution list generation processing. This means that SR[0] is set to RO[0]. In addition, if the evaluation execution list generation processing is called for an SRf[ ] acquired in Step 632 to be described later, SR[0] is set to RO[i] depending on the value of i at that time. Then, the evaluation execution list generator 73 increments i by one and increments j by one (Step 630).

On the other hand, if no data piece exists in the SRf[ ], the evaluation execution list generator 73 judges whether or not a data piece exists in the backward-direction evaluation target list SRb[ ] (Step 625). As a result of the judgment, if a data piece is determined to exist in the SRb[ ], the evaluation execution list generator 73 copies the SRb[ ] to the SR[ ] (Step 626), substitutes 0 for j (Step 627), and clears the SRb[ ] (Step 628). Thereafter, the evaluation execution list generator 73 sets the SR[j] to the RO[i] (Step 629). In this case, for example, if data does not exist in the SRf[ ] but exists only in the SRb[ ] when the evaluation execution list generation processing is called for the first time, 0 has been substituted for i in Step 604 immediately before the evaluation execution list generation processing. This means that SR[0] is set to RO[0]. In addition, if the processing has been performed on the SRf[ ] before performing processing on the SRf[ ] or if the evaluation execution list generation processing is called for an SRb[ ] acquired in Step 632 to be described later, SR[0] is set to RO[i] depending on the value of i at that time. Then, the evaluation execution list generator 73 increments i by one and increments j by one (Step 630).

On the other hand, if no data piece exists in the SRb[ ], the evaluation execution list generator 73 judges whether or not a data piece exists in the reevaluation target list SRN[ ] (Step 631). As a result of the judgment, if a data piece is determined to exist in the SRN[ ], the evaluation execution list generator 73 acquires the forward-direction evaluation target list SRf[ ] and the backward-direction evaluation target list SRb[ ] from the reevaluation target list SRN[ ] (Step 632). Then, the evaluation execution list generator 73 clears the SRN[ ] (Step 633), substitutes 0 for k (Step 634), and returns to Step 621. Thereafter, the evaluation execution list generator 73 performs, on the SRf[ ] and the SRb[ ] acquired here, processing similar to that performed on the SRf[ ] and the SRb[ ] acquired from the RR[ ] in Step 603.

No data piece in the SRN[ ], on the other hand, means that all the read target data and metadata pieces are processed. Thus, the evaluation execution list generator 73 transmits information indicating that the RO[ ] is completed back to the reading order determination unit 65 (Step 635). As the result of the above, the operation in this embodiment is terminated.

Note that in this embodiment, the tape drive 10 receives the d-id and the m-ids and determines the order of reading the data and metadata pieces based on the received d-id and m-ids and the location table, but a mode for carrying out the present invention is not limited to this. For example, the following mode may be employed. Specifically, when receiving a dm-id, the tape drive 10 acquires a d-id and an m-id by referring to a dm-a held by the tape drive 10 itself. Then, based on the acquired d-id and m-id and a location table, the tape drive 10 determines the order of reading data and metadata pieces. Furthermore, conceivable are: a mode in which the controlling mechanism 30 acquires a location table from the tape drive 10 and determines the order of reading data and metadata pieces; and a mode in which the host 200 acquires a dm-a from the controlling mechanism 30, acquires a location table from the tape drive 10, and then determines the order of reading data and metadata pieces.

As described above, in this embodiment, L-POSs indicating physical locations where data and metadata pieces are recorded are held, so that the data and metadata pieces are read according to the L-POSs even if the data and metadata pieces are recorded in wraps of different numbers. Thereby, even if data and metadata pieces to be read are recorded in different wraps in a dispersed manner, these data and metadata pieces can thereby be read efficiently.

Here, the present invention may be implemented entirely by hardware or entirely by software. Moreover, the present invention can alternatively be implemented by both hardware and software. Furthermore, the present invention can be implemented as a computer, a data processing system or a computer program. This computer program can be provided by being stored in a computer-readable medium. Here, conceivable as the medium are electronic, magnetic, optical, electromagnetic, infrared, and semiconductor systems (devices or equipment) as well as a propagation medium. Moreover, examples of the computer-readable medium are a semiconductor and solid-state storage device, a magnetic tape, a removable computer diskette, a random access memory (RAM), a read only memory (ROM), a rigid magnetic disc, and an optical disc. Current examples of the optical disk include a compact disc read-only memory (CD-ROM), a compact disc-rewritable (CD-R/W) and a DVD.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A device for reading data recorded on a recording medium having a plurality of tracks, the device comprising:
    a receiver that receives a designation of a data record to be read; and
    an acquisition unit that acquires a data association for the data record including a plurality of data elements of main data and a plurality of elements of metadata which is additional information of the main data, location information pieces indicating the recorded locations of the data elements in the direction along the tracks on which the plurality of data elements are recorded, and identification information pieces for identifying the tracks on which each of the plurality of data elements is recorded; and
    a determination unit that determines an order of reading the plurality of data elements so that, no matter on which track of the plurality of tracks each of the plurality of data elements is recorded, the plurality of data elements are read in an order of recorded locations of the data elements in a direction along the tracks on which the data elements are recorded.

2. The device according to claim 1, wherein
    the determination unit determines the order of reading the plurality of data elements, based on the location information pieces acquired by the acquisition unit.

3. The device according to claim 1, wherein the determination unit determines the order of reading the plurality of data elements so that according to a relationship between the recorded location of a certain one of the plurality of data elements in the direction along the track on which the certain data element is recorded, and the recorded location of a different one of the plurality of data elements in the direction along the track on which the different data element is recorded, a data element group including the certain data element but not including the different data element among the plurality of data elements is read by one scan involving no inversion of a reading head.

4. The device according to claim 3, wherein the determination unit determines the order of reading the plurality of data elements so that a data element group including the different data element is read by the reading head in another scan after the one scan.

5. The device according to claim 1, wherein
    the plurality of data elements include a first data element group and a second data element group, the first data element group being recorded in a first track group from which data is read in a first direction, the second data element group being recorded in a second track group from which data is read in a second direction reverse to the first direction,
    the determination unit determines the order of reading the plurality of data elements so that, no matter on which track of the first track group each data element of the first data element group is recorded, the first data element group is read in the order of the recorded locations of the data elements in the direction along the tracks on which the data elements are recorded, and no matter on which track of the second track group each data element of the second data element group is recorded, the second data element group is read in the order of the recorded locations of the data elements in the direction along the tracks on which the data elements are recorded.

6. The device according to claim 5, wherein
    the determination unit divides the plurality of data elements into the first data element group and the second data element group, based on the identification information pieces acquired by the acquisition unit.

7. A device for reading data recorded on a tape medium including a first track group from which data is read in a first direction from a leading end to a trailing end of the tape medium, and a second track group from which data is read in a second direction from the trailing end to the leading end, the device comprising:
    a receiver that receives a designation of a data record to be read;
    an acquisition unit that acquires a data association for the data record including a plurality of data elements of main data and a plurality of elements of metadata which is additional information of the main data, an identification information piece for identifying a track on which each of the plurality of data elements is recorded, and a location information piece indicating a recorded location of the each data element in a direction along the track;
    a divider that divides the plurality of data elements into a first data element group recorded in the first track group and a second data element group recorded in the second track group based on the identification information pieces acquired by the acquisition unit; and
    a determination unit that determines the order of reading the plurality of data elements based on the location information pieces acquired by the acquisition unit so that, no matter on which track of the first track group each data element of the first data element group is recorded, the first data element group is read in the order of the recorded locations of the data elements in the direction along the tracks on which the data elements are recorded, and no matter on which track of the second track group each data element of the second data element group is recorded, the second data element group is read in the order of the recorded locations of the data elements in the direction along the tracks on which the data elements are recorded.

8. A method for reading data recorded on a recording medium having a plurality of tracks, the method comprising the steps of:
    receiving designation of a data record to be read; and
    acquiring a data association for the data record including a plurality of data elements of main data and a plurality of elements of metadata which is additional information of the main data, location information pieces indicating the recorded locations of the data elements in the direction along the tracks on which the plurality of data elements are recorded, and identification information pieces for identifying the tracks on which each of the plurality of data elements is recorded; and
    determining an order of reading the plurality of data elements so that, no matter on which track of the plurality of tracks each of the plurality of data elements is recorded, the plurality of data elements are read in an order of recorded locations of the data elements in a direction along the tracks on which the data elements are recorded.

9. A non-transitory computer readable recordable medium comprising program instructions for causing a computer to function as a device for reading data recorded on a recording medium having a plurality of tracks, the program instructions, when executed, causing the computer to function as:
  a receiver that receives a designation of a data record to be read; and
  an acquisition unit that acquires a data association for the data record including a plurality of data elements of main data and a plurality of elements of metadata which is additional information of the main data, location information pieces indicating the recorded locations of the data elements in the direction along the tracks on which the plurality of data elements are recorded, and identification information pieces for identifying the tracks on which each of the plurality of data elements is recorded; and
  a determination unit that determines an order of reading the plurality of data elements so that, no matter on which track of the plurality of tracks each of the plurality of data elements is recorded, the plurality of data elements are read in an order of recorded locations of the respective data elements in a direction along the tracks on which the data elements are recorded.

\* \* \* \* \*